(12) United States Patent
Aguinaldo et al.

(10) Patent No.: US 12,221,360 B2
(45) Date of Patent: *Feb. 11, 2025

(54) LOW ENERGY EJECTOR DESALINATION SYSTEM

(71) Applicant: Bechtel Energy Technologies & Solutions, Inc., Houston, TX (US)

(72) Inventors: Jorge T. Aguinaldo, Tampa, FL (US); Joseph P. Kanzleiter, Houston, TX (US); David Ladd, Sugar Land, TX (US); Saurabh S. Tonapi, Katy, TX (US); Baki E. Goktepe, Houston, TX (US); Mukesh K. Shah, Houston, TX (US)

(73) Assignee: Bechtel Energy Technologies & Solutions, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/694,795

(22) PCT Filed: Sep. 23, 2022

(86) PCT No.: PCT/US2022/044590
§ 371 (c)(1),
(2) Date: Mar. 22, 2024

(87) PCT Pub. No.: WO2023/049386
PCT Pub. Date: Mar. 30, 2023

(65) Prior Publication Data
US 2024/0270607 A1    Aug. 15, 2024

Related U.S. Application Data

(60) Provisional application No. 63/248,175, filed on Sep. 24, 2021.

(51) Int. Cl.
*C02F 1/04* (2023.01)
*B01D 1/28* (2006.01)
(Continued)

(52) U.S. Cl.
CPC ............ *C02F 1/041* (2013.01); *B01D 1/2853* (2013.01); *B01D 3/007* (2013.01); *B01D 5/0039* (2013.01);
(Continued)

(58) Field of Classification Search
CPC ....... C02F 1/041; B01D 1/2853; B01D 3/007; B01D 5/0039
See application file for complete search history.

(56) References Cited

U.S. PATENT DOCUMENTS

| 3,288,685 A | 11/1966 | Kemper et al. |
| 3,499,827 A | 3/1970 | Cox |

(Continued)

FOREIGN PATENT DOCUMENTS

| CN | 103265140 B | 8/2014 |
| CN | 104803538 B | 1/2017 |

(Continued)

OTHER PUBLICATIONS

Kari Rodriguez; International Search Report and Written Opinion for PCT App. No. PCT/US22/44590; Mar. 20, 2023; 13 Pages; United States Patent and Trademark Office as the International Searching Authority; Alexandria, VA.

(Continued)

*Primary Examiner* — Jonathan Miller
(74) *Attorney, Agent, or Firm* — William P. Jensen; Crain Caton & James P.C.

(57) ABSTRACT

Systems and methods for treating a raw wastewater feed stream using a low energy ejector, which works as a heat pump to increase the pressure and temperature of a two-
(Continued)

phase distillate stream used, in part, to heat the raw wastewater feed stream. The systems and methods utilize heat from a liquid distillate stream and a concentrated liquid wastewater stream to pre-heat the raw wastewater feed stream and produce a liquid distillate product stream.

19 Claims, 1 Drawing Sheet

(51) Int. Cl.
  *B01D 3/00* (2006.01)
  *B01D 5/00* (2006.01)
  *C02F 103/08* (2006.01)
  *C02F 103/10* (2006.01)

(52) U.S. Cl.
  CPC ...... *C02F 2103/08* (2013.01); *C02F 2103/10* (2013.01); *C02F 2301/046* (2013.01); *C02F 2303/10* (2013.01)

(56) References Cited

U.S. PATENT DOCUMENTS

| | | | |
|---|---|---|---|
| 3,766,020 A * | 10/1973 | Sieder | C02F 1/042 159/24.2 |
| 5,507,356 A | 4/1996 | Roth et al. | |
| 5,961,826 A | 10/1999 | Kim | |
| 6,086,722 A | 7/2000 | Webster, Jr. et al. | |
| 6,089,312 A | 7/2000 | Biar et al. | |
| 6,129,841 A | 10/2000 | Dann | |
| 6,129,845 A | 10/2000 | Kim et al. | |
| 6,197,190 B1 | 3/2001 | Hanlon | |
| 6,210,578 B1 | 4/2001 | Sagastume et al. | |
| 6,245,228 B1 | 6/2001 | Kelada | |
| 6,261,456 B1 | 7/2001 | Yamasaki et al. | |
| 6,290,854 B1 | 9/2001 | Stahlbush et al. | |
| 6,334,951 B1 | 1/2002 | Cheng | |
| 6,348,134 B1 * | 2/2002 | Popov | B01D 3/10 202/205 |
| 6,447,686 B1 | 9/2002 | Choi et al. | |
| 6,447,722 B1 | 9/2002 | Rakestraw | |
| 6,461,511 B1 | 10/2002 | Baba et al. | |
| 6,464,884 B1 | 10/2002 | Gadgil | |
| 6,508,936 B1 | 1/2003 | Hassan | |
| 6,572,771 B2 | 6/2003 | Yamasaki et al. | |
| 6,579,446 B1 | 6/2003 | Teran et al. | |
| 6,596,176 B1 | 7/2003 | Delozier, II et al. | |
| 6,637,135 B2 | 10/2003 | Chesner et al. | |
| 6,645,400 B2 | 11/2003 | Martin | |
| 6,776,903 B2 | 8/2004 | Yamasaki et al. | |
| 6,821,430 B2 | 11/2004 | Andou et al. | |
| 6,837,994 B2 | 1/2005 | Izawa | |
| 6,878,285 B2 | 4/2005 | Hughes | |
| 6,890,565 B2 | 5/2005 | Sutherland | |
| 6,896,800 B2 | 5/2005 | Yamasaki et al. | |
| 7,011,750 B2 | 3/2006 | Kitayama et al. | |
| 7,225,620 B2 | 6/2007 | Klausner et al. | |
| 7,229,550 B2 | 6/2007 | Haase | |
| 7,328,591 B2 * | 2/2008 | Holtzapple | F04F 5/466 62/333 |
| 7,390,380 B1 | 6/2008 | Molintas | |
| 8,545,681 B2 | 10/2013 | Shapiro et al. | |
| 9,091,469 B2 | 7/2015 | Xiang et al. | |
| 9,221,694 B1 | 12/2015 | Govindan et al. | |
| 9,266,747 B1 | 2/2016 | Sparrow et al. | |
| 9,403,104 B2 | 8/2016 | Govindan et al. | |
| 9,539,522 B1 | 1/2017 | El-Sayed | |
| 9,643,860 B2 | 5/2017 | Katyal | |
| 9,783,431 B2 | 10/2017 | Katz | |
| 9,802,845 B2 | 10/2017 | Thiers | |
| 9,834,454 B2 | 12/2017 | Frolov et al. | |
| 10,041,177 B2 | 8/2018 | Nourbakhsh et al. | |
| 10,053,374 B2 | 8/2018 | Li et al. | |
| 10,166,493 B2 | 1/2019 | Smith et al. | |
| 10,167,218 B2 | 1/2019 | St et al. | |
| 10,294,122 B2 | 5/2019 | Ohkawara et al. | |
| 10,294,123 B2 | 5/2019 | Lam et al. | |
| 10,322,952 B1 | 6/2019 | Bader | |
| 10,351,446 B2 | 7/2019 | Yang et al. | |
| 10,399,870 B2 | 9/2019 | Clark et al. | |
| 10,508,044 B2 | 12/2019 | Wilson | |
| 10,533,793 B2 | 1/2020 | Ladd | |
| 10,550,008 B2 | 2/2020 | MacDougall et al. | |
| 10,550,014 B2 | 2/2020 | Desai et al. | |
| 10,577,269 B1 | 3/2020 | Bader | |
| 10,850,210 B2 | 12/2020 | Polnisch | |
| 10,858,267 B2 | 12/2020 | Katz | |
| 10,882,761 B2 | 1/2021 | Katz | |
| 10,894,726 B1 | 1/2021 | Pugh et al. | |
| 10,926,222 B1 | 2/2021 | Bader | |
| 10,927,024 B2 | 2/2021 | Kim et al. | |
| 10,934,198 B1 | 3/2021 | Bader | |
| 10,961,135 B2 | 3/2021 | Nakayama et al. | |
| 10,968,129 B1 | 4/2021 | Bader | |
| 10,995,027 B1 | 5/2021 | Bader | |
| 11,008,230 B2 | 5/2021 | Keller | |
| 11,021,383 B2 | 6/2021 | Dhawan et al. | |
| 11,084,736 B2 | 8/2021 | Govindan et al. | |
| 11,097,203 B1 | 8/2021 | Aguinaldo et al. | |
| 11,104,592 B2 | 8/2021 | Aboud et al. | |
| 11,114,211 B2 | 9/2021 | Mertz et al. | |
| 11,117,816 B2 | 9/2021 | Vagasky | |
| 11,155,480 B2 | 10/2021 | Moloney et al. | |
| 11,186,504 B2 | 11/2021 | Gerards | |
| 11,359,291 B2 | 6/2022 | Dhawan et al. | |
| 11,370,680 B2 | 6/2022 | Chai et al. | |
| 11,447,404 B2 | 9/2022 | Hoefferle et al. | |
| 11,459,246 B2 | 10/2022 | Katz | |
| 11,471,797 B2 | 10/2022 | Lautzenheiser et al. | |
| 11,485,652 B2 | 11/2022 | Parkey et al. | |
| 11,485,658 B2 | 11/2022 | Park | |
| 11,498,858 B2 | 11/2022 | Jorden et al. | |
| 11,565,958 B2 | 1/2023 | Dhawan et al. | |
| 11,607,622 B2 | 3/2023 | Aguinaldo et al. | |
| 2002/0017494 A1 | 2/2002 | Haase | |
| 2004/0055866 A1 | 3/2004 | Levine | |
| 2008/0083605 A1 * | 4/2008 | Holtzapple | B01D 1/28 239/398 |
| 2011/0162952 A1 | 7/2011 | Conchieri et al. | |
| 2012/0118722 A1 | 5/2012 | Holtzapple et al. | |
| 2015/0251924 A1 * | 9/2015 | Li | B01D 3/146 203/10 |
| 2016/0368785 A1 | 12/2016 | Zamir | |
| 2017/0057834 A1 * | 3/2017 | Popov | B01D 3/105 |
| 2018/0280888 A1 | 10/2018 | Fukuzaki et al. | |
| 2018/0297866 A1 | 10/2018 | Yoshikawa et al. | |
| 2018/0361269 A1 * | 12/2018 | Popov | B01D 3/007 |
| 2019/0184305 A1 * | 6/2019 | Popov | B01D 5/0039 |
| 2019/0208774 A1 | 7/2019 | Lei et al. | |
| 2019/0300394 A1 | 10/2019 | Miyakawa et al. | |
| 2019/0375658 A1 | 12/2019 | Ness et al. | |
| 2020/0131059 A1 | 4/2020 | Gaid et al. | |
| 2020/0155972 A1 | 5/2020 | Gaid et al. | |
| 2020/0223718 A1 | 7/2020 | Henry et al. | |
| 2020/0325051 A1 | 10/2020 | Gil | |
| 2020/0361787 A1 | 11/2020 | Thiers et al. | |
| 2020/0369542 A1 | 11/2020 | Islas et al. | |
| 2020/0407250 A1 | 12/2020 | Ulmert | |
| 2021/0001279 A1 | 1/2021 | Lee et al. | |
| 2021/0024388 A1 | 1/2021 | Murayama et al. | |
| 2021/0061684 A1 | 3/2021 | Kondo | |
| 2021/0130202 A1 | 5/2021 | Islas et al. | |
| 2021/0147257 A1 | 5/2021 | Katz | |
| 2021/0214250 A1 | 7/2021 | Imamura et al. | |
| 2021/0253456 A1 | 8/2021 | Johnson | |
| 2021/0261449 A1 | 8/2021 | Miyake et al. | |
| 2021/0276900 A1 | 9/2021 | Hirai et al. | |
| 2021/0283525 A1 | 9/2021 | Aguinaldo et al. | |
| 2021/0299613 A1 | 9/2021 | Davies | |
| 2021/0379605 A1 | 12/2021 | Jansson | |
| 2022/0089463 A1 | 3/2022 | Ervin | |
| 2022/0127172 A1 | 4/2022 | Friesen et al. | |

(56) References Cited

U.S. PATENT DOCUMENTS

| | | |
|---|---|---|
| 2022/0127730 A1 | 4/2022 | Chen et al. |
| 2022/0144668 A1 | 5/2022 | Kawarabayashi |
| 2022/0212961 A1 | 7/2022 | Nakamura |
| 2022/0347629 A1 | 11/2022 | Ino et al. |
| 2022/0396513 A1 | 12/2022 | Schmidt et al. |
| 2022/0402777 A1 | 12/2022 | Katz |
| 2023/0043485 A1 | 2/2023 | Katz |

FOREIGN PATENT DOCUMENTS

| | | |
|---|---|---|
| CN | 106362425 B | 11/2018 |
| CN | 112079404 A | 12/2020 |
| CN | 108002623 B | 5/2021 |
| CN | 113072115 A | 7/2021 |
| CN | 113184939 A | 7/2021 |
| EP | 1095910 A1 | 5/2001 |
| EP | 3919369 A1 | 12/2021 |
| EP | 4116265 A1 | 1/2023 |
| WO | 0033958 A1 | 6/2000 |
| WO | 0174843 A1 | 10/2001 |
| WO | 2006021796 A1 | 3/2006 |
| WO | 2017066534 A1 | 4/2017 |
| WO | 2018159561 A1 | 9/2018 |
| WO | 2018193907 A1 | 10/2018 |
| WO | 2019008822 A1 | 1/2019 |
| WO | 2019045270 A1 | 3/2019 |
| WO | 2019193849 A1 | 10/2019 |
| WO | 2019208532 A1 | 10/2019 |
| WO | 2019208645 A1 | 10/2019 |
| WO | 2020026924 A1 | 2/2020 |
| WO | 2020122012 A1 | 6/2020 |
| WO | 2020179789 A1 | 9/2020 |
| WO | 2020230373 A1 | 11/2020 |
| WO | 2020241494 A1 | 12/2020 |
| WO | 2020262231 A1 | 12/2020 |
| WO | 2021020030 A1 | 2/2021 |
| WO | 2021037781 A1 | 3/2021 |
| WO | 2021106570 A1 | 6/2021 |
| WO | 2021141149 A1 | 7/2021 |
| WO | 2022168948 A1 | 8/2022 |
| WO | 2022169298 A1 | 8/2022 |
| WO | 2022175206 A1 | 8/2022 |
| WO | 2022176405 A1 | 8/2022 |
| WO | 2022186013 A1 | 9/2022 |
| WO | 2022218939 A1 | 10/2022 |

OTHER PUBLICATIONS

"Produced Water", Wikipedia, 2016 [as retrieved from the internet on Dec. 29, 2022 (Dec. 29, 2022) at <https://en.wikipedia.org/wiki/Produced_water>].

Jonathan Miller; International Preliminary Report on Patentability for PCT App. No. PCT/US22/44590; Nov. 20, 2023; 5 Pages; United States Patent and Trademark Office as the International Searching Authority; Alexandria, VA.

Multiple Phase Ejector Pilot Plant; John H. Leigh; United States Department of the Interior; Jun. 1970; 76 pages.

Study of Multi-Phase Ejectors for Distillation Desalination Systems; Clarence A. Kemper et al.; United States Department of the Interior; Jan. 1964; 84 pages.

Experimental and numerical investigation of two phase ejector performance with the water injected into the induced flow; WeiXiong Chen et al.; International Journal of Advanced Nuclear Reactor Design and Technology; 2020; 10 pages.

Current Advances in Ejector Modeling, Experimentation and Applications for Refrigeration and Heat Pumps. Part 1: Single-Phase Ejectors; Zine Aidoun et al.; Inventions; Jan. 14, 2019; 73 pages; Switzerland.

Jonathan Miller; International Preliminary Report on Patentability for PCT/US22/44590; Nov. 20, 2023; 5 pages; USPTO as the International Preliminary Examination Authority; Alexandria, VA.

* cited by examiner

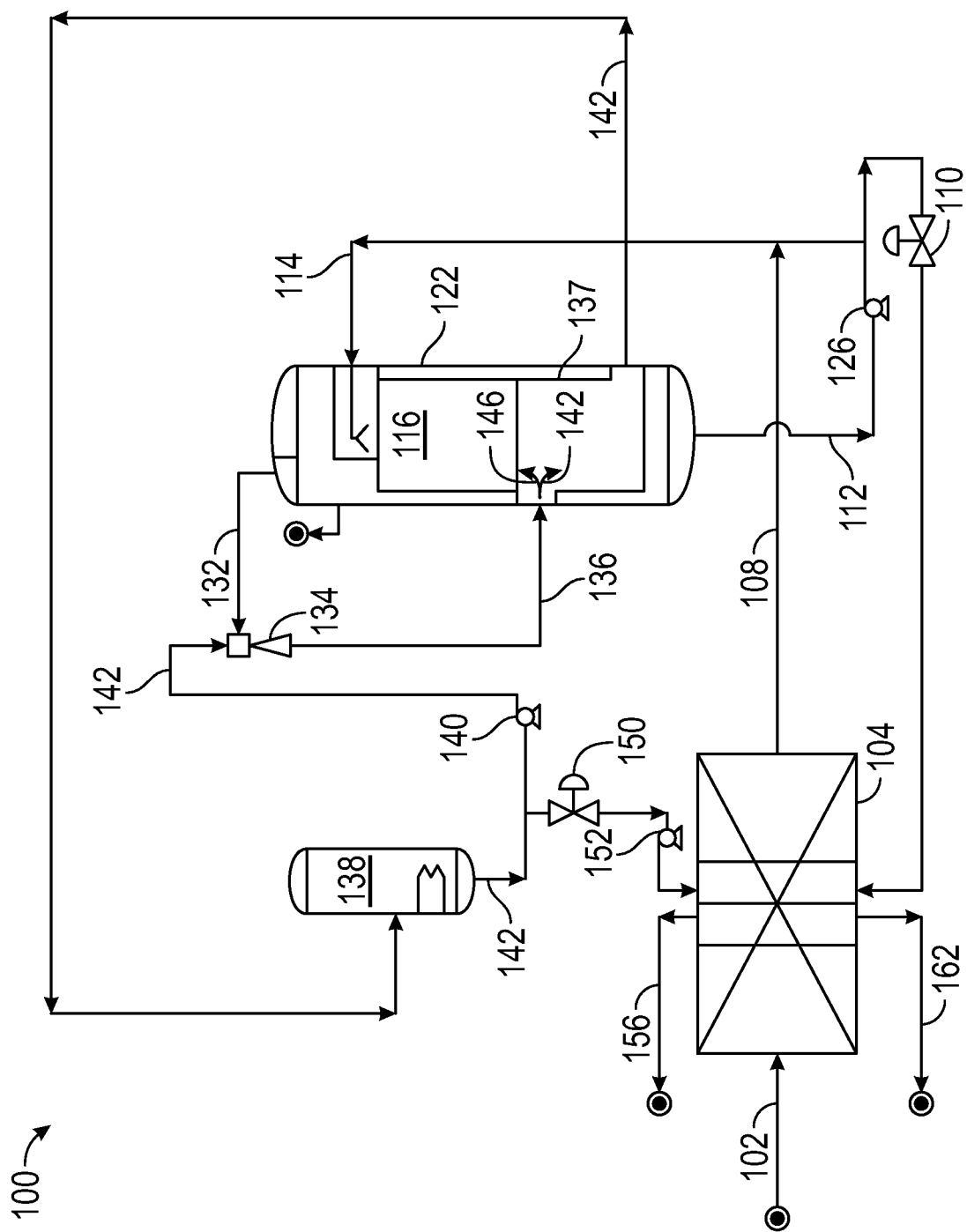

LOW ENERGY EJECTOR DESALINATION SYSTEM

CROSS-REFERENCE TO RELATED APPLICATIONS

This application is a U.S. National Stage Application of PCT Application Serial No. PCT/US22/44590 filed Sep. 23, 2022, which claims priority to U.S. Provisional Application Ser. No. 63/248,175, filed Sep. 24, 2021, which are each incorporated herein by reference. This application, U.S. Pat. Nos. 11,607,622 and 11,097,203, which are also incorporated herein by reference and are commonly assigned to Bechtel Energy Technologies & Solutions, Inc.

FIELD OF THE DISCLOSURE

The present disclosure generally relates to treatment and desalination of seawater, produced water, and other high salinity water; it also has applicability to treatment of nuclear wastewater and other treatment processes requiring evaporator-based treatment. More particularly, the present disclosure relates to use of a low energy ejector desalination system (LEEDS), employing a static liquid-gas ejector (with no moving parts) and maximum heat integration in a water treatment system.

BACKGROUND

Thermal desalination processes that use steam as a heating medium typically use a vapor conditioning system to extract heat from the available steam through heat transfer. When these processes use vapor compression, either thermal or mechanical, they typically require auxiliary steam for start-up and to enhance normal operations.

The auxiliary steam for start-up and to enhance normal operations generally requires a fossil-fuel fired boiler to make the steam. The boiler for the auxiliary steam will usually require an air emissions permit to address emissions from fossil fuel combustion, which can include carbon monoxide, nitrogen oxides, and carbon dioxide. Permitting the boiler can be a challenge for facilities that do not normally produce steam (such as LNG) or facilities in environmentally sensitive areas or in other areas where air emission permits are difficult to obtain. Eliminating the need for the boiler has the further advantage of avoiding combustion of the boiler fuel and the associated emissions.

BRIEF DESCRIPTION OF THE DRAWING

The present disclosure is described below with references to the accompanying drawing, and in which:

FIG. 1 is a schematic diagram illustrating one embodiment of a LEEDS process according to the present disclosure.

DETAILED DESCRIPTION OF THE ILLUSTRATIVE EMBODIMENT

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following FIGURE and detailed description. It is intended that all such additional features and advantages be included within the scope of the disclosed embodiments. Further, the illustrated FIGURE is only exemplary and is not intended to assert or imply any limitation with regard to the environment, architecture, design, or process in which different embodiments may be implemented. All streams described are carried by physical lines. To the extent that temperatures and pressures are referenced in the following description, those conditions are merely illustrative and are not meant to limit the disclosure.

The present disclosure overcomes one or more deficiencies in the prior art by providing a process for treatment and desalination of wastewater that does not require auxiliary steam during start-up or to enhance normal operations, thus eliminating the need to use (and obtain an air emissions permit for) a boiler for the auxiliary steam. The ability to treat high salt content wastewater without requiring steam augmentation is a primary component that sets the process apart from conventional processes in the market. The process also allows maximum use of pumps to convey streams. These are principally accomplished by use of the static liquid-gas ejector (with no moving parts) and maximum heat integration in the water treatment system.

In one embodiment, the present disclosure includes a system for treating a raw wastewater feed stream, comprising: i) a heat exchanger to heat a wastewater stream and create a two-phase stream; ii) a column in fluid communication with the heat exchanger for separating the two-phase stream into a vapor distillate stream and a concentrated liquid wastewater stream; iii) an ejector in fluid communication with the column for combining the vapor distillate stream from the column and a liquid distillate stream to produce an ejector two-phase stream; iv) a separator in fluid communication with the ejector that separates the ejector two-phase stream into another vapor distillate stream and the liquid distillate stream, wherein the vapor distillate stream and the another vapor distillate stream are in fluid communication; v) a pump in fluid communication with the ejector to send the liquid distillate stream as a motive fluid to the ejector; and vi) another pump in fluid communication with and positioned downstream from the column for pumping at least a portion of the concentrated liquid wastewater stream to the heat exchanger.

In another embodiment, the present disclosure includes a method for treating a raw wastewater feed stream, comprising: i) heating a wastewater stream to create a two-phase stream; ii) separating the two-phase stream into a vapor distillate stream and a concentrated liquid wastewater stream; iii) combining the vapor distillate stream and a liquid distillate stream to produce another two-phase stream with a temperature higher than a temperature of the vapor distillate stream, wherein the liquid distillate stream is recirculated through a column, a distillate tank, and an ejector; iv) separating the another two-phase stream into another vapor distillate stream and the liquid distillate stream; and v) pumping at least a portion of the concentrated liquid wastewater stream to the heat exchanger.

Referring now to FIG. 1, the system 100 is a low energy ejector desalination system for processing a pre-treated or pre-conditioned raw wastewater feed stream 102, which may comprise aqueous feed streams with or without saline water and/or a high concentration of suspended and/or dissolved solids. The pre-treatment or pre-conditioning of the raw wastewater feed stream 102 minimizes scaling and corrosion in the heat exchangers and other associated equipment. The pre-treatment or pre-conditioning may include chemical precipitation, coagulation, and flocculation, softening by precipitation and ion exchange, addition of anti-sealant and anti-corrosion chemicals, pH adjustment, and other means to prevent scaling and corrosion in the associated equipment.

The raw wastewater feed stream 102 is sent to a heat exchanger system 104 where heat is recovered from the distillate and the concentrated wastewater streams and transferred to the raw wastewater feed stream 102 to produce a heated aqueous feed stream 108. The heated aqueous feed stream 108 is mixed with a concentrated liquid wastewater stream 112 exiting an outlet in the bottom of column 122 to produce a mixed aqueous feed stream 114 that may be pumped through to a falling film heat exchanger 116 positioned in column 122 using a pump 126. The concentrated liquid wastewater stream 112 may also be pumped through heat exchanger system 104 to heat the raw wastewater feed stream 102. As it passes through the heat exchanger system 104, the concentrated liquid wastewater stream 112 is cooled and becomes a liquid wastewater product stream 162 for collection. A flow regulator 110, which may be a valve, may be used to control the flow of concentrated wastewater stream to the heat exchanger system 104 to heat the feed stream 102.

The mixed aqueous feed stream 114 is distributed through the falling film heat exchanger 116, which heats the mixed aqueous feed stream 114 and creates a two-phase mixed aqueous feed stream. A hot vapor distillate is separated from the two-phase mixed aqueous feed stream in column 122 after it leaves the falling film heat exchanger 116. The hot vapor distillate collects above the falling film heat exchanger 116 in column 122 and exits an outlet in the top of column 122 as a hot vapor distillate stream 132. Concentrated liquid wastewater, which may include brine, is separated from the two-phase mixed aqueous feed stream in column 122 after the hot vapor distillate leaves the falling film heat exchanger 116. The concentrated liquid wastewater collects below the falling film heat exchanger 116 in column 122 and exits the outlet in the bottom of column 122 as the concentrated liquid wastewater stream 112.

The hot vapor distillate stream 132 is drawn into an ejector 134 by suction, where it is mixed with and compressed by a high-temperature liquid distillate stream 142, which functions as a motive fluid. Preferably, the ejector 134 is a static liquid-gas ejector (with no moving parts). The ejector 134 produces a two-phase distillate stream 136, which is at a temperature slightly higher than that of the hot vapor distillate stream 132. The two-phase distillate stream 136 is ejected into a separator 137 in the falling film heat exchanger 116. The separator 137 separates the two-phase distillate stream 136 into the liquid distillate stream 142 and another hot vapor distillate stream 146.

The hot vapor distillate stream 146 enters a hot side inlet of the falling film heat exchanger 116 and rises upward through individual heating elements to heat the mixed aqueous feed stream 114 distributed downward between the individual heating elements and create the two-phase mixed aqueous feed stream. The hot vapor distillate stream 146 combines with the hot vapor distillate from the two-phase mixed aqueous feed stream above the falling film heat exchanger 116 in column 122 and exits the outlet in the top of column 122 as the hot vapor distillate stream 132. The liquid distillate stream 142 falls downward through the individual heating elements and exits an outlet near the bottom of column 122. The liquid distillate stream 142 is then sent to a distillate tank 138 where it is collected and heated during start-up operations.

The liquid distillate stream 142 exits an outlet in the bottom of the distillate tank 138 and is pumped through to the ejector 134, to function as a motive fluid, using a pump 140. A portion of the liquid distillate stream 142, once at the predetermined temperature and level, is pumped through the heat exchanger system 104, to heat the raw wastewater feed stream 102, using a pump 152. As it passes through the heat exchanger system 104, the liquid distillate stream 142 is cooled and becomes a liquid distillate product stream 156 for collection. Another flow regulator 150, which may be a valve, may be used to control the flow of the liquid distillate stream 142 from the distillate tank 138 to the heat exchanger system 104 to heat the feed stream 102.

The installation of the falling film heat exchanger 116 inside column 122 and incorporation of the separator 137 in the falling film heat exchanger 116 significantly reduces the footprint of the system 100 and further reduces heat loss. The column 122 also allows venting of non-condensable gases. The ejector 134, which works as a heat pump, increases the pressure and temperature of the two-phase distillate stream 136. This provides an additional heat contribution to the vapor compression evaporation process.

The system 100 is unique, simple, and environmentally friendly. The system 100 is made more efficient by using heat from the liquid distillate stream 142 and the concentrated liquid wastewater stream 112 to heat the raw wastewater feed stream 102. The system 100 further yields a value-added liquid distillate product stream 156 and liquid wastewater product stream 162.

While the present disclosure has been described in connection with presently preferred embodiments, it will be understood by those skilled in the art that it is not intended to limit the disclosure in those embodiments. In addition to the treatment of wastewater, LEEDS can be applied to treat other aqueous streams with a high concentration of suspended solids such as the production of high quality distilled or demineralized water, the reduction of volume of aqueous streams, and the recovery of products where evaporation is employed. It is therefore, contemplated that various alternative embodiments and modifications may be made to the disclosed embodiments without departing from the spirit and scope of the appended claims and equivalents thereof.

The invention claimed is:

1. A system for treating a raw wastewater feed stream, comprising:
    a heat exchanger to heat a wastewater stream and create a two-phase stream;
    a column in fluid communication with the heat exchanger for separating the two-phase stream into a vapor distillate stream and a concentrated liquid wastewater stream;
    an ejector in fluid communication with the column for combining the vapor distillate stream from the column and a liquid distillate stream to produce an ejector two-phase stream;
    a separator in fluid communication with the ejector that separates the ejector two-phase stream into another vapor distillate stream and the liquid distillate stream, wherein the vapor distillate stream and the another vapor distillate stream are in fluid communication;

a pump in fluid communication with the ejector to send the liquid distillate stream as a motive fluid to the ejector; and another pump in fluid communication with and positioned downstream from the column for pumping at least a portion of the concentrated liquid wastewater stream to the heat exchanger.

2. The system of claim 1, wherein the column encloses the heat exchanger and the separator.

3. The system of claim 1, wherein the raw wastewater feed stream is an aqueous stream comprising suspended solids.

4. The system of claim 1, further comprising another heat exchanger or heat exchanger systems to heat the raw wastewater feed stream using the liquid distillate stream and the concentrated liquid wastewater stream.

5. The system of claim 4, wherein the column is in fluid communication with the liquid distillate stream.

6. The system of claim 5, further comprising a distillate tank in fluid communication with the column and the ejector for collecting the liquid distillate stream.

7. The system of claim 2, wherein the heat exchanger is a falling film heat exchanger.

8. The system of claim 1, wherein the raw wastewater feed stream is an aqueous stream comprising dissolved solids.

9. The system of claim 4, further comprising a flow regulator for controlling a flow of the concentrated liquid wastewater stream to the another heat exchanger or heat exchanger system.

10. The system of claim 4, further comprising a flow regulator for controlling a flow of the liquid distillate stream to the another heat exchanger or heat exchanger system.

11. The system of claim 1, wherein the ejector is a static liquid-gas ejector.

12. A method for treating a raw wastewater feed stream, comprising:

heating a wastewater stream to create a two-phase stream;

separating the two-phase stream into a vapor distillate stream and a concentrated liquid wastewater stream;

combining the vapor distillate stream and a liquid distillate stream to produce another two-phase stream with a temperature higher than a temperature of the vapor distillate stream, wherein the liquid distillate stream is recirculated through a column, a distillate tank, and an ejector;

separating the another two-phase stream into another vapor distillate stream and the liquid distillate stream; and pumping at least a portion of the concentrated liquid wastewater stream to the heat exchanger.

13. The method of claim 12, wherein the wastewater stream is heated by the another vapor distillate stream in a falling film heat exchanger.

14. The method of claim 12, wherein the raw wastewater feed stream is an aqueous stream comprising suspended or dissolved solids.

15. The method of claim 12, further comprising heating the raw wastewater feed stream using the liquid distillate stream and the concentrated liquid wastewater stream.

16. The method of claim 12, wherein the column separates the two-phase stream into the vapor distillate stream and the concentrated liquid wastewater stream.

17. The method of claim 12, wherein the distillate tank collects the liquid distillate stream from the column.

18. The method of claim 12, wherein the ejector combines the vapor distillate stream and the liquid distillate stream to produce the another two-phase stream.

19. The method of claim 12, further comprising sending the liquid distillate stream from the distillate tank to the ejector as a motive fluid.

* * * * *